United States Patent
Liu et al.

(10) Patent No.: US 12,305,972 B2
(45) Date of Patent: May 20, 2025

(54) METHOD FOR MEASURING DEFORMATION OF DUMMY RIB

(71) Applicants: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

(72) Inventors: Zhixin Liu, Tianjin (CN); Zhixin Wu, Tianjin (CN); Hong Zheng, Tianjin (CN); Liwei Qin, Tianjin (CN); Weidong Liu, Tianjin (CN); Hong Chen, Tianjin (CN); Hai Liu, Tianjin (CN); Kai Wang, Tianjin (CN)

(73) Assignees: CHINA AUTOMOTIVE TECHNOLOGY AND RESEARCH CENTER CO., LTD, Tianjin (CN); CATARC AUTOMOTIVE TEST CENTER (TIANJIN) CO., LTD, Tianjin (CN)

( * ) Notice: Subject to any disclaimer, the term of this patent is extended or adjusted under 35 U.S.C. 154(b) by 259 days.

(21) Appl. No.: 18/187,697

(22) Filed: Mar. 22, 2023

(65) Prior Publication Data
US 2024/0102792 A1    Mar. 28, 2024

(30) Foreign Application Priority Data
Sep. 19, 2022   (CN) .......................... 202211133833.6

(51) Int. Cl.
*G01B 11/16*   (2006.01)
*G01B 11/00*   (2006.01)

(52) U.S. Cl.
CPC ............ *G01B 11/16* (2013.01); *G01B 11/002* (2013.01)

(58) Field of Classification Search
CPC ... G01B 11/16; G01B 11/002; G01M 17/0078
See application file for complete search history.

(56) References Cited

U.S. PATENT DOCUMENTS 5,317,931 A * 6/1994 Kalami ............ G01M 17/0078
                                                            33/760
7,508,530 B1 * 3/2009 Handman ................. G01S 5/16
                                                            356/624
(Continued)

FOREIGN PATENT DOCUMENTS

CN         103357705 A      10/2013
CN         108982126 A      12/2018
(Continued)

OTHER PUBLICATIONS

Li Shi-Cheng et al., Mechanical Research & Application, Research on Parallax Correction Method for High-Speed Image Motion Analysis, 2014, vol. 27, No. 129, pp. 79-84, China.

*Primary Examiner* — Jonathan M Hansen
(74) *Attorney, Agent, or Firm* — True Shepherd LLC; Andrew C. Cheng

(57) ABSTRACT

A method for measuring deformation of dummy rib, includes: controlling a plurality of laser device groups to slide along corresponding curve segments respectively, and executing the following steps when the laser device groups slide to each sampling point, to obtain a degree of deformation at a position, corresponding to the sampling point, on to-be-measured dummy rib, the following steps including: controlling a laser range finder to emit a laser beam in a normal vector direction of a tangent corresponding to a position on a slide rail; determining whether the laser range finder receives corresponding reflected laser. This embodiment can have advantages of simple operation, low cost, and high accuracy.

9 Claims, 6 Drawing Sheets

(56) References Cited

U.S. PATENT DOCUMENTS

| | | | |
|---|---|---|---|
| 9,335,225 B2 * | 5/2016 | Xu | G01B 5/30 |
| 11,514,213 B2 | 11/2022 | Shah et al. | |
| 2003/0083844 A1 * | 5/2003 | Reddi | G01S 5/163 |
| | | | 702/150 |
| 2007/0058163 A1 * | 3/2007 | Handman | G01C 15/002 |
| | | | 356/152.1 |

FOREIGN PATENT DOCUMENTS

| | | |
|---|---|---|
| CN | 112284758 A | 1/2021 |
| CN | 113386923 A | 9/2021 |
| CN | 114486073 A | 5/2022 |
| CN | 114486292 A | 5/2022 |
| DE | 102013009815 A1 | 12/2013 |
| JP | 2014202676 A | 10/2014 |

\* cited by examiner

METHOD FOR MEASURING DEFORMATION OF DUMMY RIB

CROSS-REFERENCE TO RELATED APPLICATIONS

This application claims priority to Chinese Patent Application No. 202211133833.6 with a filing date of Sep. 19, 2022. The content of the aforementioned application, including any intervening amendments thereto, is incorporated herein by reference.

TECHNICAL FIELD

The present invention relates to the field of crash tests, in particular to a method for measuring deformation of dummy rib.

DESCRIPTION OF RELATED ART

A vehicle crash test dummy is a mechanical apparatus that simulates a structure and mechanical characteristics of a human body. In order to simulate deformation characteristics and mechanical characteristics of a human chest after impact and satisfy reuse requirements of a dummy, the dummy chest is mainly composed of a chest skeleton and chest skin. A chest displacement sensor is disposed inside the dummy chest and used for measuring the amount of compression of the dummy chest in a crash test. The maximum amount of compression of the dummy chest is an important index to evaluate injuries of the dummy. Large deformation often occurs in the chest. In a high-speed calibration test of a chest, the maximum amount of compression of the dummy chest can reach one third of a thickness of a chest cavity.

As main components for bearing impact response, reflecting mechanical characteristics, and controlling a shape of the chest cavity, the dummy rib are generally composed of spring steel and damping materials. Therefore, in the whole skeleton of the dummy, rib are one of a few elastic elements that need to produce large deformation. In addition, in order to ensure repeatability and reproducibility of the dummy, the dummy rib need to have accurate mechanical characteristics and shape structure after being impacted. However, in an actual impact test, the dummy rib often produce large deformation repeatedly due to repeated impact, and some rib that produce plastic deformation change their shapes, and then produce different pre-stress after being assembled with sternums, to produce stiffness specificity, resulting in performance differences between different dummies. In addition, spring steel for dummy rib needs to undergo quenching and tempering to obtain elasticity in a manufacturing process, which may cause distortion due to thermal stress. At present, a shape of a three-dimensional curved surface is usually measured by using a three-dimensional scanning device based on a point cloud, which is generally complicated and time-consuming in operation, low in measurement accuracy and high in device cost.

In view of this, the present invention is provided.

SUMMARY OF PRESENT INVENTION

In order to solve the foregoing technical problems, the present invention provides a method for measuring a deformation of a dummy rib, which has advantages of simple operation, low cost, and high accuracy.

An embodiment of the present invention provides a method for measuring a deformation of a dummy rib. The method is implemented by a rib form measuring apparatus; the rib form measuring apparatus includes a slide rail, an imaging component, and a plurality of laser device groups; the slide rail is disposed on a periphery of to-be-measured dummy rib, and curvature of each position on the slide rail is identical to that of a corresponding position of pre-designed initial dummy rib; the plurality of laser device groups are disposed on different curve segments of the slide rail, and each laser device group includes a laser range finder; the imaging component includes a photosensitive material disposed inside the slide rail; and the method includes:

controlling the plurality of laser device groups to slide along corresponding curve segments respectively, and executing the following steps when the laser device groups slide to each sampling point, to obtain a degree of deformation at a position, corresponding to the sampling point, on the to-be-measured dummy rib, the following steps including:

controlling the laser range finder to emit a laser beam in a normal vector direction of a tangent corresponding to a position of the laser range finder on the slide rail;

determining whether the laser range finder receives corresponding reflected laser;

obtaining, if the laser range finder receives no corresponding reflected laser, a position where the corresponding reflected laser is received on the imaging component; and determining the degree of deformation at the position, corresponding to the sampling point, on the to-be-measured dummy rib according to a position where the laser range finder emits the laser beam on the corresponding curve segment and the position where the corresponding reflected laser is received on the imaging component.

The embodiments of the present invention have the following technical effects that when the laser range finder slides to each sampling point, the laser range finder may be controlled to emit the laser beam in the normal vector direction of the tangent corresponding to the position of the laser range finder on the slide rail, the laser beam is reflected after arriving at a surface of the to-be-measured dummy rib, and the corresponding reflected laser may be received by the laser range finder or the photosensitive material on the imaging component. If the reflected laser is received by the photosensitive material on the imaging component, the degree of deformation at the position, corresponding to the sampling point, on the to-be-measured dummy rib is determined according to the position where the laser range finder emits the laser beam on the corresponding curve segment and the position where the corresponding reflected laser is received on the imaging component. In this way, the degree of deformation at the position, corresponding to each sampling point, on the to-be-measured dummy rib may be determined. It may be seen that in the solution, the foregoing steps may be executed only by disposing the rib form measuring apparatus on the periphery of the to-be-measured dummy rib, which is simple in operation. The rib form measuring apparatus includes the slide rail, the laser range finders, the imaging component, etc., which are low in cost. In addition, the accuracy of the degree of deformation determined on the basis of the laser beam is relatively high. Therefore, the method provided by the embodiment of the present invention has advantages of simple operation, low cost, and high accuracy.

BRIEF DESCRIPTION OF THE DRAWINGS

In order to describe technical solutions in specific embodiments of the present invention or in the prior art more clearly, the following briefly introduces the accompanying drawings required in the description of the specific embodiments or the prior art. Apparently, the accompanying drawings in the following description show only some embodiments of the present invention, and those of ordinary skill in the art can still derive other drawings from these drawings without any creative effort.

REFERENCE NUMERALS

Figure 1:
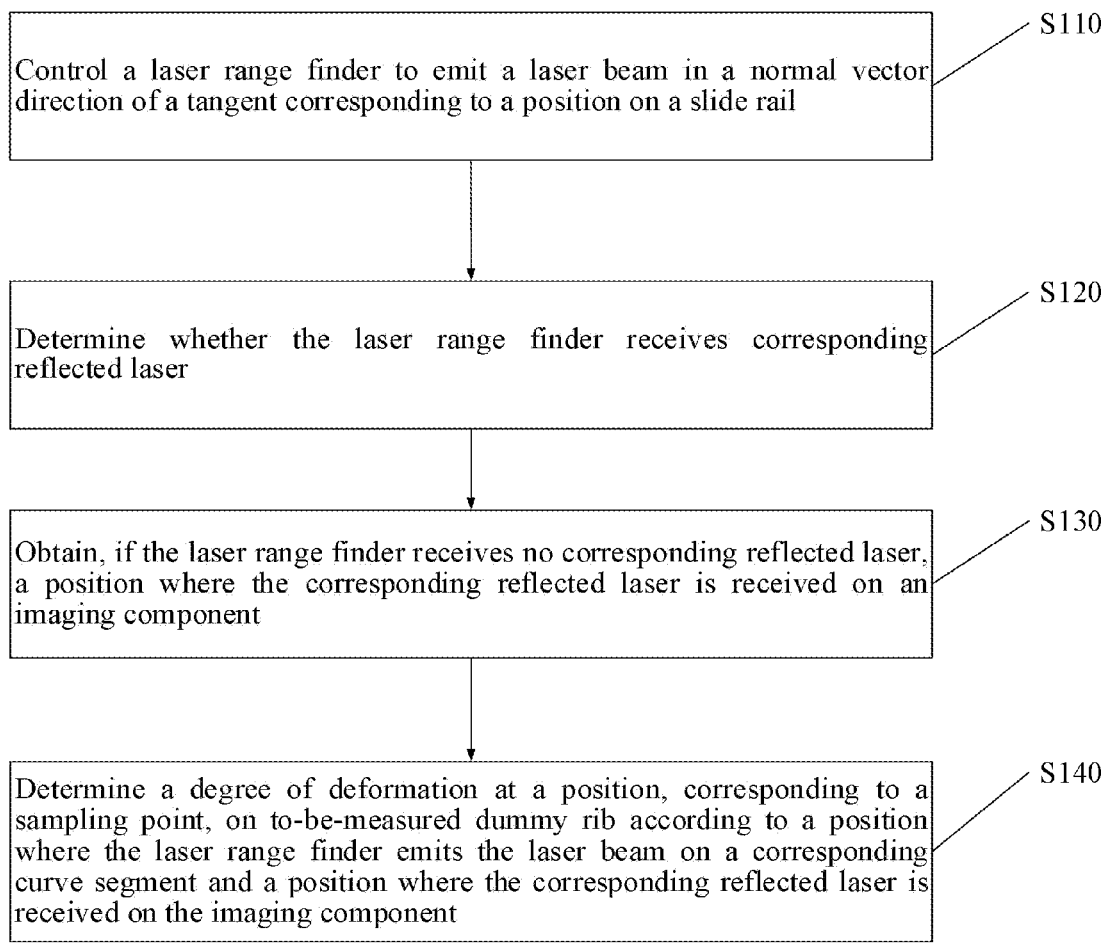
FIG. 1 is a flow diagram of steps required to be executed when a laser device group slides to each sampling point in a method for measuring a deformation of a dummy rib according to an embodiment of the present invention.

1—first laser device group; 2—to-be-measured dummy rib; 3—second laser device group; 4—imaging component; 5—stationary fixture; 6—third laser device group; 7—slide rail; 8—fourth laser device group; 9—reflective film on surface of to-be-measured dummy rib;

10—outer contour of to-be-measured dummy rib without deformation in a horizontal plane; 11—slide rail; 12—laser device group; 13—incident vertical laser and reflected vertical laser; 14—tangent of a corresponding position, where bending deformation does not occur in a horizontal direction, on a surface of to-be-measured dummy rib;

15—outer contour of to-be-measured dummy rib with deformation in a horizontal plane; 16—slide rail; 17—reflected vertical laser; 18—laser device group; 19—incident vertical laser; 20—tangent of a corresponding position, where bending deformation occurs in a horizontal direction, on a surface of to-be-measured dummy rib;

21—incident horizontal laser and reflected horizontal laser; 22—tangent of a corresponding position, where torsional deformation does not occur in a vertical direction, on a surface of to-be-measured dummy rib; and 23—imaging component; 24—incident horizontal laser; 25—reflected horizontal laser; 26—tangent of a corresponding position, where torsional deformation occurs in a vertical direction, on a surface of to-be-measured dummy rib.

DESCRIPTION OF THE EMBODIMENTS

In order to make objectives, technical solutions and advantages of the present invention clearer, the technical solutions of the present invention will be described clearly and completely below. Obviously, the described embodiments are only some rather than all, embodiments of the present invention. Based on the embodiments of the present invention, all other embodiments obtained by those of ordinary skill in the art without any creative effort fall within the protection scope of the present invention.

In a first aspect, an embodiment of the present invention provides a method for measuring a deformation of a dummy rib. The method is used for measuring deformation of dummy rib, which is simple in operation, and is implemented by a rib form measuring apparatus, which is relatively low in hardware cost. The method may be executed by a controller.

The method for measuring the deformation of the dummy rib provided by the embodiment of the present invention is implemented by a rib form measuring apparatus; the rib form measuring apparatus includes a slide rail, an imaging component, and a plurality of laser device groups; the slide rail is disposed on a periphery of to-be-measured dummy rib, and curvature of each position on the slide rail is identical to that of a corresponding position of pre-designed initial dummy rib; the plurality of laser device groups are disposed on different curve segments of the slide rail, and each laser device group includes a laser range finder; and the imaging component includes a photosensitive material disposed inside the slide rail.

The pre-designed initial dummy rib refer to dummy rib that undergo no vehicle crash test, and a shape of the initial dummy rib is consistent with a designed shape of the dummy rib. After at least one vehicle crash test, the shapes of the dummy rib change, and this change may be reflected in bending of an outer contour on a horizontal plane and torsion on a vertical plane.

The to-be-measured dummy rib refer to dummy rib that undergo one or more vehicle crash tests, and deformation of the dummy rib may be obtained only after measurement.

The curvature of each position on the slide rail is identical to that of the corresponding position of the pre-designed initial dummy rib, that is, a shape of the slide rail is consistent with that of the pre-designed initial dummy rib, and at each of the corresponding positions, curvature of the slide rail is identical to that of the pre-designed initial dummy rib.

Curvature of each curve segment of the slide rail is consistent with that of a contour shape of the pre-designed initial dummy rib, and the slide rail is a "concentric circle" of the pre-designed initial dummy rib. The contour of the dummy rib is a convex curve, so at each point on the slide rail curve, only one normal vector tangent to the corresponding position on the contour of the rib passes the point.

Understandably, sizes of different initial dummy rib may be different, but their shapes and curvature of the contour do not change, so even if sizes of the to-be-measured dummy rib are different, the foregoing rib form measuring apparatus may also be used for measuring the degree of deformation.

The slide rail is disposed on the periphery of the to-be-measured dummy rib, and may include a plurality of curve segments, a laser device group is disposed on each curve segment, and each laser device group may slide on a respective curve segment.

One laser device group includes one laser range finder capable of emitting a laser beam in a normal vector direction of a tangent corresponding to a position of the laser range finder on the slide rail. That is, the laser range finder cannot rotate by taking itself as a reference system. The laser range finder may emit and receive a laser beam. When laser emitted to a surface of the to-be-measured dummy rib is reflected, if the surface of the to-be-measured dummy rib has little deformation, the laser range finder may receive the reflected laser.

If the surface of the to-be-measured dummy rib has large deformation, the laser range finder cannot receive the reflected laser. In order to determine a specific receiving position of the reflected laser in this case, a circle of an imaging component is disposed inside the slide rail, and the imaging component includes a photosensitive material disposed inside the slide rail, that is, if the reflected laser is received at a position of the imaging component, the photosensitive material at the position may react, and further a specific position at which the reflected laser is received is obtained.

The method for measuring the deformation of the dummy rib provided by the embodiment of the present invention includes the following steps:

the plurality of laser device groups are controlled to slide along corresponding curve segments respectively, and the following S110 to S140 are executed when the laser device groups slide to each sampling point, to obtain a degree of deformation at the position, corresponding to the sampling point, on the to-be-measured dummy rib.

With reference to FIG. 1, when the laser device groups slide to each sampling point, the following steps are performed:

S110: the laser range finder is controlled to emit a laser beam in a normal vector direction of a tangent corresponding to a position of the laser range finder on the slide rail;

S120: whether the laser range finder receives corresponding reflected laser is determined;

S130: if the laser range finder receives no corresponding reflected laser, a position where the corresponding reflected laser is received on the imaging component is obtained; and S140: the degree of deformation at the position, corresponding to the sampling point, on the to-be-measured dummy rib is determined according to the position where the laser range finder emits the laser beam on the corresponding curve segment and the position where the corresponding reflected laser is received on the imaging component.

This embodiment has the following technical effects.

When each laser range finder slides along a respective curve segment on the slide rail, a plurality of sampling points are disposed on each curve segment, and each sampling point has a corresponding position on the to-be-measured dummy rib. When the laser range finder slides to each sampling point, the laser range finder is controlled to emit a laser beam in the normal vector direction of the tangent corresponding to the position of the laser range finder on the slide rail, the laser beam is reflected after arriving at a surface of the to-be-measured dummy rib, and the corresponding reflected laser may be received by the laser range finder or the photosensitive material on the imaging component. If the reflected laser is received by the photosensitive material on the imaging component, the degree of deformation at the position, corresponding to the sampling point, on the to-be-measured dummy rib is determined according to the position where the laser range finder emits the laser beam on the corresponding curve segment and the position where the corresponding reflected laser is received on the imaging component. In this way, the degree of deformation at the position, corresponding to each sampling point, on the to-be-measured dummy rib may be determined. It may be seen that in the solution, the foregoing steps may be executed only by disposing the rib form measuring apparatus on the periphery of the to-be-measured dummy rib, which is simple in operation. The rib form measuring apparatus includes the slide rail, the laser range finders, the imaging component, etc., which are low in cost. In addition, the accuracy of the degree of deformation determined on the basis of the laser beam is relatively high. Therefore, the method provided by the embodiment of the present invention has advantages of simple operation, low cost, and high accuracy.

The foregoing steps are described in detail below.

S110: the laser range finder is controlled to emit a laser beam in a normal vector direction of a tangent corresponding to a position of the laser range finder on the slide rail.

Specifically, the laser device group may be driven to slide along the slide rail by a motor, and the motor may be controlled by a controller. When the laser range finder arrives at a sampling point, the controller controls the laser range finder to emit a laser beam in the normal vector direction of the tangent corresponding to a current position of the laser range finder on the slide rail.

S120: whether the laser range finder receives corresponding reflected laser is determined.

Specifically, the laser range finder may transmit a signal to the controller when receiving the reflected laser, and may transmit no signal to the controller if the laser range finder receives no reflected laser. Therefore, the controller may know, according to reception of the signal within a certain time period, whether the laser range finder receives the corresponding reflected laser.

Understandably, if the laser range finder receives the corresponding reflected laser, it is indicated that the degree of deformation at the position, corresponding to the sampling point, on the to-be-measured dummy rib is less than a preset limit value, and the degree of deformation may be considered as 0 in this case.

S130: if the laser range finder receives no corresponding reflected laser, a position where the corresponding reflected laser is received on the imaging component is obtained.

Understandably, if the laser range finder receives no corresponding reflected laser, it is indicated that the reflected laser is received by the imaging component, so the position where the corresponding reflected laser is received on the imaging component is obtained in this case. If the reflected laser is received at a position of the imaging component, the reflected laser may be converted into an electrical signal for image or spectral measurement.

S140: the degree of deformation at the position, corresponding to the sampling point, on the to-be-measured dummy rib is determined according to the position where the laser range finder emits the laser beam on the corresponding curve segment and the position where the corresponding reflected laser is received on the imaging component.

For example, an angle between a reflected light beam and an incident light beam may be determined according to the position of the laser range finder on the slide rail and the position where the corresponding reflected laser is received on the imaging component, then a reflection angle corresponding to the reflected light beam may be obtained, and a tangent at the position, corresponding to the sampling point, on the to-be-measured dummy rib may be obtained. A tangent of the pre-designed initial dummy rib corresponding to the sampling point may be determined from the incident light beam. According to the angle between the two tangents, the degree of deformation at the position, corresponding to the sampling point, on the to-be-measured dummy rib may be obtained.

In one embodiment, each laser device group may further include a light processing lens group for processing the laser beam emitted from the laser range finder into horizontal laser and vertical laser. That is, before the laser beam is emitted from the laser range finder and arrives at the to-be-measured dummy rib, the laser beam is processed into two laser beams: horizontal laser and vertical laser. The horizontal laser is sector laser with a specific angle emitted along a horizontal plane. The vertical laser is sector laser with a specific angle emitted along a vertical plane. The horizontal laser and the vertical laser have different spectral characteristics. The laser device group may measure deformation of the to-be-measured dummy rib within a projection range of the sector laser beam with a specific angle.

On this basis, S140 may specifically include at least one of the following steps:

(1) a degree of bending deformation at the position, corresponding to the sampling point, on the to-be-measured dummy rib in a horizontal direction is determined according to the position where the laser range finder emits the laser beam on the corresponding curve segment and the position where the reflected laser corresponding to the vertical laser is received on the imaging component.

Figure 2:
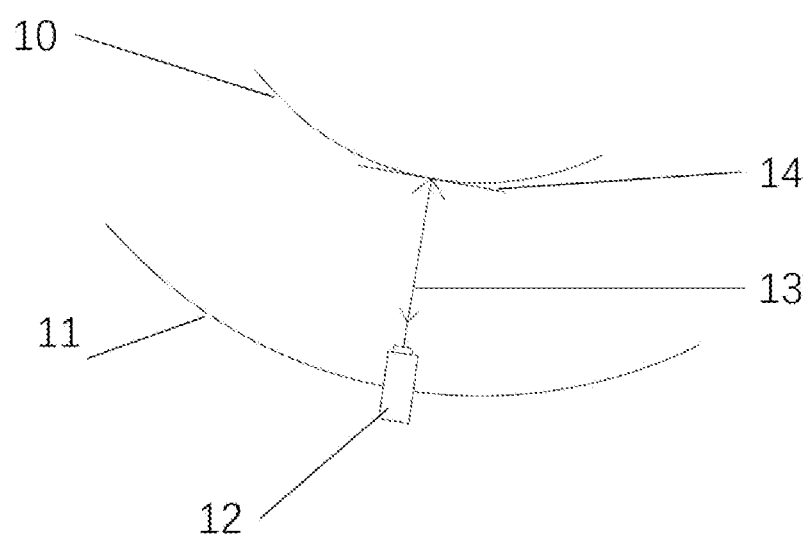
FIG. 2 is a top view of an optical path when excessive bending deformation does not occur in to-be-measured dummy rib in a horizontal direction according to an embodiment of the present invention.

It may be understood that, with reference to FIG. 2, in a process that the motor drives the laser range finder to move along the slide rail, excessive bending deformation does not occur at an outer contour 10 of the to-be-measured dummy rib at the place scanned by the laser range finder in the laser device group 12. Specifically, the laser beam emitted from the laser range finder is transmitted in a normal vector direction of a horizontal tangent corresponding to the position of the laser range finder on the slide rail 11 through the vertical laser beam emitted from the light processing lens group, that is, the incident angle is 90 degrees, the reflected beam will return to the laser range finder according to its original incident path to form a complete optical path, and the laser range finder may obtain the distance between the laser range finder and the to-be-measured dummy rib at the position through the complete optical path. The incident vertical laser and the reflected vertical laser are in the same optical path, and are both denoted by reference numeral 13. The tangent of the corresponding position, where bending deformation does not occur in the horizontal direction, on the surface of the to-be-measured dummy rib is denoted by reference numeral 14.

Figure 3:
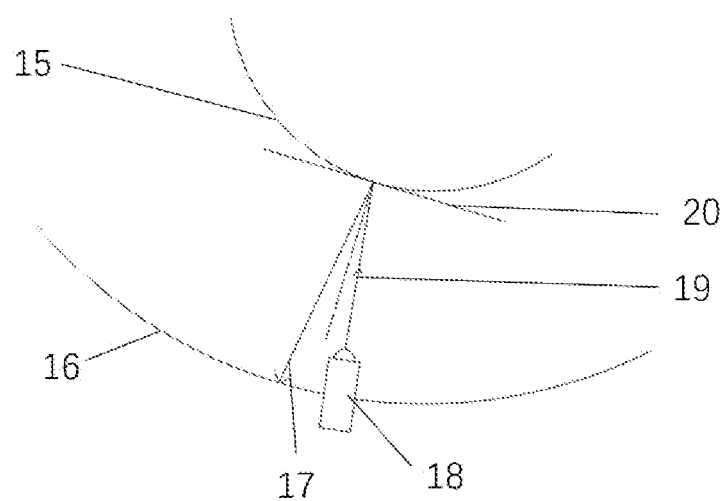
FIG. 3 is a top view of an optical path when excessive bending deformation occurs in to-be-measured dummy rib in a horizontal direction according to an embodiment of the present invention.

With reference to FIG. 3, if bending deformation of an outer contour 15 of the to-be-measured dummy rib exceeds a limit, that is, after vertical laser 19 emitted after the laser beam emitted from the laser range finder in the laser device group 18 passes the light processing lens group is emitted in the normal vector direction of the horizontal tangent corresponding to the position of the laser range finder on the slide rail 16, reflected laser cannot return to the laser range finder along the original incident path, the laser range finder cannot detect a main ray spectrum of reflected vertical laser 17, and it may be determined that the bending deformation of the to-be-measured dummy rib in the horizontal direction exceeds the limit. The tangent of the corresponding position, where the bending deformation occurs in the horizontal direction, on the surface of the to-be-measured dummy rib is denoted by reference numeral 20.

After the vertical laser is reflected by the deformed to-be-measured dummy rib, the reflected laser will fall in the imaging component inside the slide rail and be received by the photosensitive material, and further an accurate receiving position of the reflected laser is obtained, so that an angle between the incident vertical laser and the reflected vertical laser may be determined according to the position where the laser range finder emits the laser beam on the corresponding curve segment and the position where the reflected laser corresponding to the vertical laser is received on the imaging component, further a reflection angle of the reflected vertical laser may be determined, and a horizontal tangent at the position, corresponding to the sampling point, on the to-be-measured dummy rib may be obtained. A horizontal tangent at the position, corresponding to the sampling point, on the pre-designed initial dummy rib may be determined from the incident vertical laser. According to the angle between the two horizontal tangents, the degree of deformation of the position, corresponding to the sampling point, on the to-be-measured dummy rib in the horizontal direction may be obtained.

(2) a degree of torsional deformation at the position, corresponding to the sampling point, on the to-be-measured dummy rib in a vertical direction is determined according to the position where the laser range finder emits the laser beam on the corresponding curve segment and the position where the reflected laser corresponding to the horizontal laser is received on the imaging component.

Figure 4:
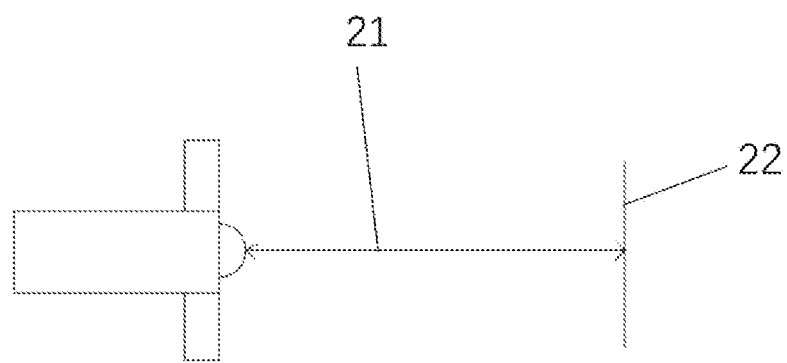
FIG. 4 is a side view of an optical path when excessive bending deformation does not occur in to-be-measured dummy rib in a vertical direction according to an embodiment of the present invention.

It may be understood that, with reference to FIG. 4, in a process that the motor drives the laser range finder to move along the slide rail, excessive bending deformation does not occur in the to-be-measured dummy rib at the place scanned by the laser range finder, the horizontal laser emitted after the laser beam emitted from the laser range finder passes the light processing lens group is emitted in a normal vector direction of a vertical tangent corresponding to the position of the laser range finder on the slide rail, that is, the incident angle is 90 degrees, the reflected beam will return to the laser range finder according to its original incident path to form a complete optical path, and the laser range finder may obtain the distance between the laser range finder and the to-be-measured dummy rib at the position through the complete optical path. In FIG. 4, the incident horizontal laser and the reflected horizontal laser are in the same path, and are both denoted by reference numeral 21. The incident horizontal laser arrives at the surface of the to-be-measured dummy rib, and the tangent at the corresponding position where torsional deformation does not occur is denoted by reference numeral 22.

Figure 5:
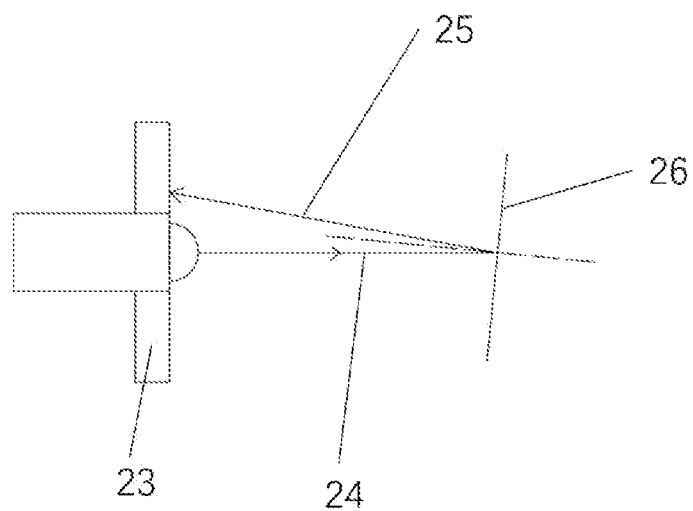
FIG. 5 is a side view of an optical path when excessive bending deformation occurs in to-be-measured dummy rib in a vertical direction according to an embodiment of the present invention.

With reference to FIG. 5, if bending deformation of the to-be-measured dummy rib exceeds a limit, that is, after horizontal laser 24 emitted after the laser beam emitted from the laser range finder passes the light processing lens group is emitted in the normal vector direction of the vertical tangent corresponding to the position of the laser range finder on the slide rail, reflected horizontal laser 25 cannot return to the laser range finder along the original incident path but is received by the imaging component 23, the laser range finder cannot detect a main ray spectrum of the reflected horizontal laser, and it may be determined that the bending deformation of the to-be-measured dummy rib at the position in the horizontal direction exceeds the limit. The tangent of the corresponding position, where the torsional deformation occurs in the vertical direction, on the surface of the to-be-measured dummy rib is denoted by reference numeral 26.

After the horizontal laser is reflected by the deformed to-be-measured dummy rib, the reflected laser will fall in the imaging component inside the slide rail and be received by the photosensitive material, and further an accurate receiving position of the reflected laser is obtained, so that an angle between the incident horizontal laser and the reflected horizontal laser may be determined according to the position where the laser range finder emits the laser beam on the corresponding curve segment and the position where the reflected laser corresponding to the horizontal laser is received on the imaging component, further a reflection angle of the reflected horizontal laser may be determined, and a vertical tangent at the position, corresponding to the sampling point, on the to-be-measured dummy rib may be obtained. A vertical tangent at the position, corresponding to the sampling point, on the pre-designed initial dummy rib may be determined from the incident vertical laser. According to the angle between the two vertical tangents, the degree of deformation of the position, corresponding to the sampling point, on the to-be-measured dummy rib in the vertical direction may be obtained.

Degrees of deformation of the to-be-measured dummy rib in the horizontal direction and the vertical direction at the corresponding position of each sampling point may be determined through the foregoing steps.

In one embodiment, the method provided in this embodiment of the present invention may further include the following S150 to S180.

S150: coordinates of the position, corresponding to the sampling point, on the to-be-measured dummy rib are determined according to the laser beam emitted from the laser range finder and the corresponding reflected laser received by the laser range finder or the imaging component.

In practice, the reflected laser may be received by the laser range finder or the imaging component. The distance between the to-be-measured dummy rib and the slide rail at the corresponding position may be calculated according to the time difference between incident laser and reflected laser, and then the coordinates corresponding to the position on the to-be-measured dummy rib may be obtained. In this way, coordinates of the to-be-measured dummy rib at all positions corresponding to all sampling points may be obtained.

Figure 6:
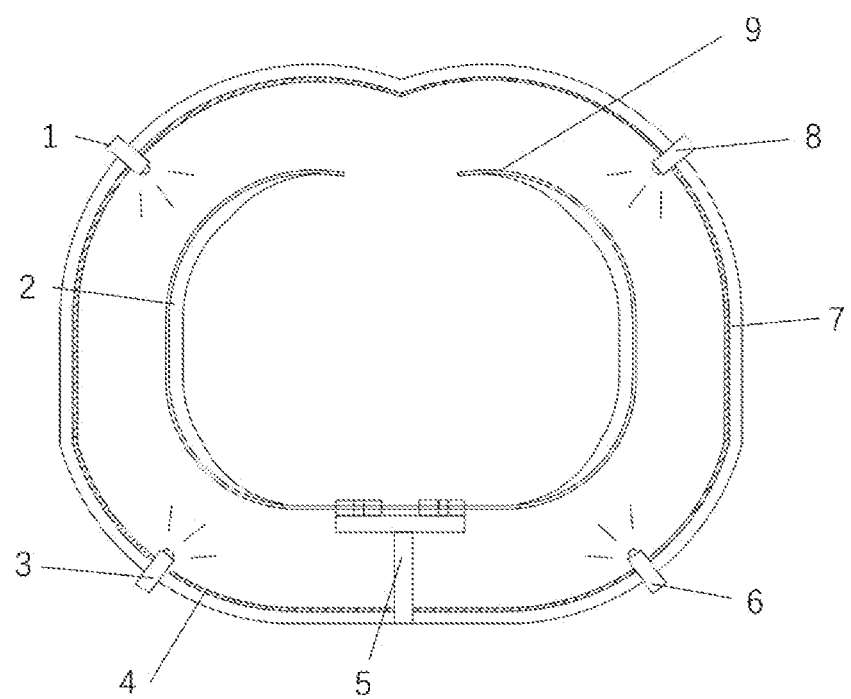
FIG. 6 is a schematic diagram of mounting of to-be-measured dummy rib and a rib form measuring apparatus according to an embodiment of the present invention.

In one embodiment, both the to-be-measured dummy rib and the initial dummy rib may be of a C-shaped structure. With reference to FIG. 6, the C-shaped structure includes four curve segments and three straight segments. The straight segments and the curve segments are disposed alternately, each straight segment is used for connecting two adjacent curve segments, and each curve segment corresponds to a laser device group, so there are four laser device groups, which are marked as 1, 3, 6, and 8, respectively. A slide rail 7 is disposed on a periphery of to-be-measured dummy rib 2, and a circle of imaging component 4 is disposed inside the slide rail. The C-shaped structure is divided into a first segment and a second segment by a middle perpendicular of a straight segment opposite an opening of the C-shaped structure. For example, the first segment is a left portion and the second segment is a right portion.

In order to further improve a reflection effect of laser, for example, in FIG. 6, a reflective Film 9 is disposed on a surface of the to-be-measured dummy rib 2.

It may be seen that the C-shaped structure is a semi-closed irregular curved structure, and a front end, close to a front side of the dummy, of the structure is disconnected for connecting a sternum of the dummy.

It may be seen that the outer contour of the to-be-measured dummy rib in the horizontal plane is simplified as a two-dimensional curve. For example, there are four laser device groups, and after each laser device group completes measurement in a respective curve segment, coordinates of n positions on the outer contour of the to-be-measured dummy rib may be obtained: fi(xi, yi) (i=1, 2, 3, 4, . . . n). The n positions may be divided into left and right portions P1[f1, f2, . . . , fm] and P2[fm+1, . . . , fn] by the middle perpendicular of the straight segment opposite the opening of the C-shaped structure.

S160: polynomial fitting is performed on an outer contour of the to-be-measured dummy rib on a horizontal plane according to the coordinates of the position, corresponding to each sampling point, on the to-be-measured dummy rib, to obtain a fitting curve expression corresponding to the to-be-measured dummy rib.

Specifically, S160 may include the following steps:
(1) polynomial fitting is performed on a first outer contour corresponding to the first segment of the to-be-measured dummy rib on the horizontal plane according to the coordinates of the position, corresponding to each sampling point, on the first segment of the to-be-measured dummy rib, to obtain a first fitting curve expression corresponding to the first segment of the to-be-measured dummy rib; and
(2) polynomial fitting is performed on a second outer contour corresponding to the second segment of the to-be-measured dummy rib on the horizontal plane according to the coordinates of the position, corresponding to each sampling point, on the second segment of the to-be-measured dummy rib, to obtain a second fitting curve expression corresponding to the second segment of the to-be-measured dummy rib.

That is, polynomial fitting is performed on the first segment of the outer contour of the to-be-measured dummy rib, to obtain the first fitting curve expression corresponding to the first segment. In addition, polynomial fitting is performed on the second segment of the outer contour of the to-be-measured dummy rib, to obtain the second fitting curve expression corresponding to the second segment.

That is, for the to-be-measured dummy rib, the left portion is fitted to obtain the first fitting curve expression, and the right portion is fitted to obtain the second fitting curve expression. The to-be-measured dummy rib are represented by the two fitting curve expressions because one fitting curve expression cannot uniquely represent the C-shaped to-be-measured dummy rib shown in FIG. 6.

S170: polynomial fitting is performed on an outer contour of the pre-designed initial dummy rib on the horizontal plane to obtain a fitting curve expression corresponding to the initial dummy rib.

Specifically, S170 may include the following steps:
(1) polynomial fitting is performed on a first outer contour corresponding to a first segment of the pre-designed initial dummy rib on the horizontal plane, to obtain a first fitting curve expression corresponding to the first segment of the initial dummy rib; and
(2) polynomial fitting is performed on a second outer contour corresponding to a second segment of the pre-designed initial dummy rib on the horizontal plane, to obtain a second fitting curve expression corresponding to the second segment of the initial dummy rib.

That is, polynomial fitting is performed on the first segment of the outer contour of the pre-designed initial dummy rib, to obtain the first fitting curve expression corresponding to the first segment. In addition, polynomial fitting is performed on the second segment of the outer contour of the pre-designed initial dummy rib, to obtain the second fitting curve expression corresponding to the second segment.

That is, for the pre-designed initial dummy rib, the left portion is fitted to obtain the first fitting curve expression, and the right portion is fitted to obtain the second fitting curve expression.

S180: a degree of deformation of the to-be-measured dummy rib on the horizontal plane is calculated according to the fitting curve expression corresponding to the to-be-measured dummy rib and the fitting curve expression corresponding to the initial dummy rib.

Specifically, S180 may include the following steps:

(1) a degree of deformation of the first segment of the to-be-measured dummy rib on the horizontal plane is calculated according to the first fitting curve expression corresponding to the first segment of the to-be-measured dummy rib and the first fitting curve expression corresponding to the first segment of the initial dummy rib; and (2) a degree of deformation of the second segment of the to-be-measured dummy rib on the horizontal plane is calculated according to the second fitting curve expression corresponding to the second segment of the to-be-measured dummy rib and the second fitting curve expression corresponding to the second segment of the initial dummy rib.

That is, a degree of overall deformation of the left portion of the to-be-measured dummy rib on the horizontal plane may be calculated according to the first fitting curve expression corresponding to the left portion of the to-be-measured dummy rib and the first fitting curve expression corresponding to the left portion of the initial dummy rib. A degree of overall deformation of the right portion of the to-be-measured dummy rib on the horizontal plane may be calculated according to the second fitting curve expression corresponding to the right portion of the to-be-measured dummy rib and the second fitting curve expression corresponding to the right portion of the initial dummy rib.

For example, after the four laser range finders complete measurement on the respective curve segments, coordinates fi(xi, yi) (i=1, 2, 3, 4, . . . n) of n positions on the outer contour of the dummy rib may be obtained, the outer contour of the dummy rib is divided into a left portion and a right portion, a set of positions in the left portion is P1[f1, f2, . . . , fm], and a set of positions in the right portion is P2[fm+1, . . . fn].

If a family of linearly independent primary functions for fitting the outer contours of the left portion and the right portion is:

$$\emptyset=\mathrm{span}\{\varphi_0(x),\varphi_1(x),\varphi_2(x),\ldots,\varphi_k(x)\},$$

the left portion is fitted k times through a least square method, to obtain the first fitting curve expression corresponding to the left portion of the to-be-measured dummy rib as follows:

$$S_{left}(x)=\Sigma_{i=0}^{k} a_i \varphi_i(x)$$

wherein, k<m, $a_i$ is an $i^{th}$ fitting coefficient, and $\varphi_i(x)$ is an $i^{th}$ primary function.

The right portion is fitted k times, to obtain the second fitting curve expression corresponding to the right portion of the to-be-measured dummy rib as follows:

$$S_{right}(x)=\Sigma_{i=0}^{k} a_i \varphi_i(x)$$

wherein, k<(n-m), the meanings of other parameters are identical to above. k is a number of fittings, and the higher k indicates higher fitting accuracy, but k cannot exceed the number of positions of each portion.

Span{ } refers to a "span space" in the matrix theory, and the foregoing primary functions represent a family of linearly independent functions. For example, k is 3, and a simplest family of functions may be {1, x, x2}. In this case, any polynomial equation of degree less than 2 may be expressed by a linear combination of the family of functions. Span specifically means this in mathematics.

The outer contour of the left portion of the pre-designed initial dummy rib may also be fitted by a polynomial, to obtain the first fitting curve expression corresponding to the left portion of the initial dummy rib as follows:

$$S^*_{left}(x)=\Sigma_{i=0}^{k} a_i \varphi_i(x)$$

wherein, k<m, and the meanings of other parameters are identical to above.

Polynomial fitting may also be performed on the outer contour of the right portion of the pre-designed initial dummy rib, to obtain the second fitting curve expression corresponding to the right portion of the initial dummy rib as follows:

$$S_{right}(x)=\Sigma_{i=0}^{k} a_i \varphi_i(x)$$

It is assumed that an ordinate of each of the foregoing fitting curve expressions is Y, for example, $Y_{left}1=S_{left}(x1)$, and others are similar. Abscissas x1, x2, . . . , xh of h positions at fixed intervals are selected, ordinates of h positions in the first fitting curve expression corresponding to the left portion of the to-be-measured dummy rib are $Y_{left1}$, $Y_{left2}$ . . . $Y_{leftn}$, and an average value of the ordinates is calculated. Ordinates of h positions in the second fitting curve expression corresponding to the right portion of the to-be-measured dummy rib are $Y_{right1}$, $Y_{right2}$ . . . $Y_{rightn}$, and an average value of the ordinates is calculated.

Similarly, ordinates of h positions in the first fitting curve expression corresponding to the left portion of the initial dummy rib $Y^*_{left1}$, $Y^*_{left2}$ . . . $Y^*_{leftn}$, and an average value of the ordinates is calculated. Ordinates of h positions in the second fitting curve expression corresponding to the right portion of the initial dummy rib are $Y^*_{right1}$, $Y^*_{right2}$ . . . $Y^*_{rightn}$, and an average value of the ordinates is calculated.

(1) For the left portion $$P_{left} = \frac{\sum_{i=1}^{h}\left(Y_{lefti}-\overline{Y_{left}}\right)\left(Y^*_{lefti}-\overline{Y^*_{left}}\right)}{\sqrt{\sum_{i}^{h}\left(Y_{lefti}-\overline{Y_{left}}\right)^2 \sum_{i}^{h}\left(Y_{lefti}-\overline{Y^*_{left}}\right)^2}}$$

in the formula, $P_{left}$ is a degree of horizontal bending of the left portion of the to-be-measured dummy rib, $Y_{lefti}$ is an ordinate of an $i^{th}$ position in the first fitting curve expression corresponding to the left portion of the to-be-measured dummy rib, and $\overline{Y}_{left}$ is an average value of the ordinates of the positions in the first fitting curve expression corresponding to the left portion of the to-be-measured dummy rib; $Y^*_{lefti}$ is an ordinate of the $i^{th}$ position in the first fitting curve expression corresponding to the left portion of the initial dummy rib; $\overline{Y}^*_{left}$ is an average value of the ordinates of the positions in the first fitting curve expression corresponding to the left portion of the initial dummy rib; and h is the number of positions, with fixed intervals, selected in the first fitting curve expression corresponding to the left portion of the to-be-measured dummy rib and the first fitting curve expression corresponding to the left portion of the initial dummy rib separately.

(2) For the right portion $$P_{right} = \frac{\sum_{i=1}^{h}(Y_{righti} - \overline{Y_{right}})(Y^*_{righti} - \overline{Y^*_{right}})}{\sqrt{\sum_{i}^{h}(Y_{righti} - \overline{Y_{right}})^2 \sum_{i}^{h}(Y_{righti} - \overline{Y^*_{right}})^2}}$$

in the formula, $P_{right}$ is a degree of horizontal bending of the right portion of the to-be-measured dummy rib, $Y_{righti}$ is an ordinate of an $i^{th}$ position in the second fitting curve expression corresponding to the right portion of the to-be-measured dummy rib, and $\overline{Y}_{right}$ is an average value of the ordinates of the positions in the second fitting curve expression corresponding to the right portion of the to-be-measured dummy rib; $Y^*_{righti}$ is an ordinate of the $i^{th}$ position in the second fitting curve expression corresponding to the right portion of the initial dummy rib; $\overline{Y}^*_{right}$ is an average value of the ordinates of the positions in the second fitting curve expression corresponding to the right portion of the initial dummy rib; and h is the number of positions with fixed intervals selected in the second fitting curve expression corresponding to the right portion of the to-be-measured dummy rib and the second fitting curve expression corresponding to the right portion of the initial dummy rib, respectively.

The foregoing formulas evaluate a similarity between a shape curve of the left and right to-be-measured dummy rib and a shape curve of the initial dummy rib by using normalized correlation coefficients, so as to obtain a degree of bending. P is 1 when the two shape curves are identical, 0 when the two shape curves are completely unrelated, and between 0 and 1 when the two shape curves are similar in some way. Denominators in the foregoing formulas cannot be 0.

In one embodiment, with reference to FIG. 6, a stationary fixture 5 for fixing the to-be-measured dummy rib is disposed at the straight segment opposite the opening of the C-shaped structure in the to-be-measured dummy rib.

As may be seen from FIG. 6, there is a long straight segment on the rear side of the dummy rib and two positioning holes on the straight segment for connecting with the spine, and a large spine metal block for protecting may be mounted on the front side of the dummy rib. Because crash occurs in the dummy on the front side and little deformation occurs on the rear side, a measuring tool is positioned through the positioning holes on the rear side.

It should be noted that the terms used in the present invention are only used for describing specific embodiments, rather than limiting the scope of the present application. As shown in the description and claims of the present invention, unless the context clearly dictates otherwise, the words "a", "one", "an", and/or "the" are not intended to specifically refer to the singular and can include the plural. The terms "include", "comprise", or any variants thereof are intended to cover a non-exclusive inclusion, so that a process, method, or device that includes a series of elements not only includes these elements, but also includes other elements not listed explicitly, or includes inherent elements of the process, method, or device. In the absence of more limitations, an element defined by "include a . . . " does not exclude other same elements existing in the process, method, or device including the element.

It should also be noted that the orientation or position relations indicated by the terms "center", "upper", "lower", "left", "right", "vertical", "horizontal", "inner", "outer", etc. are based on the orientation or position relations shown in the accompanying drawings and are intended to facilitate the description of the present invention and simplify the description only, rather than indicating or implying that the device or element referred to must have a particular orientation or be constructed and operated in a particular orientation, and cannot be interpreted as limiting the present invention. Unless otherwise expressly specified and limited, the terms "mounted", "coupled", and "connected" should be generally understood, for example, the "connected" may be fixedly connected, detachably connected, integrally connected, mechanically connected, electrically connected, directly connected, or connected by a medium, or internal communication between two elements. For those of ordinary skill in the art, the specific meanings of the terms described above in the present invention can be construed according to specific circumstances.

Finally, it should be noted that the above embodiments are only for illustrating rather than limiting the technical solutions of the present invention; although the present invention is described in detail with reference to the foregoing embodiments, those of ordinary skill in the art should understood that the technical solutions described in the foregoing embodiments can be modified, or some or all technical features can be equivalently substituted; and such modifications or substitutions do not make the essence of the corresponding technical solutions depart from the technical solutions of the present invention.

What is claimed is:

1. A method for measuring a deformation of dummy rib, wherein the method is implemented by a rib form measuring apparatus; the rib form measuring apparatus comprises a slide rail, an imaging component, and a plurality of laser device groups; the slide rail is disposed on a periphery of a to-be-measured dummy rib, and curvature of each position on the slide rail is identical to that of a corresponding position of a pre-designed initial dummy rib; the plurality of laser device groups are disposed on different curve segments of the slide rail, and each laser device group comprises a laser range finder; the imaging component comprises a photosensitive material disposed inside the slide rail; the method comprises:

controlling the plurality of laser device groups to slide along corresponding curve segments respectively, and executing the following steps when the laser device groups slide to each sampling point, to obtain a degree of deformation at a position, corresponding to the sampling point, on the to-be-measured dummy rib:

controlling the laser range finder to emit a laser beam in a normal vector direction of a tangent corresponding to a position of the laser range finder on the slide rail;

determining whether the laser range finder receives corresponding reflected laser;

obtaining, if the laser range finder receives no corresponding reflected laser, a position where the corresponding reflected laser is received on the imaging component; and determining the degree of deformation at the position, corresponding to the sampling point, on the to-be-measured dummy rib according to a position where the laser range finder emits the laser beam on the corresponding curve segment and the position where the corresponding reflected laser is received on the imaging component;
wherein each laser device group further comprises a light processing lens group for processing the laser beam emitted from the laser range finder into horizontal laser and vertical laser; and
accordingly, the determining the degree of deformation at the position, corresponding to the sampling point, on the to-be-measured dummy rib according to a position where the laser range finder emits the laser beam on the corresponding curve segment and the position where the corresponding reflected laser is received on the imaging component comprises:
determining a degree of bending deformation at the position, corresponding to the sampling point, on the to-be-measured dummy rib in a horizontal direction according to the position where the laser range finder emits the laser beam on the corresponding curve segment and a position where the reflected laser corresponding to the vertical laser is received on the imaging component.

2. The method according to claim 1, wherein the determining the degree of deformation at the position, corresponding to the sampling point, on the to-be-measured dummy rib according to a position where the laser range finder emits the laser beam on the corresponding curve segment and the position where the corresponding reflected laser is received on the imaging component further comprises:
determining a degree of torsional deformation at the position, corresponding to the sampling point, on the to-be-measured dummy rib in a vertical direction according to the position where the laser range finder emits the laser beam on the corresponding curve segment and a position where the reflected laser corresponding to the horizontal laser is received on the imaging component.

3. The method according to claim 1, further comprising:
determining, if the laser range finder receives the corresponding reflected laser, that the degree of deformation at the position, corresponding to the sampling point, on the to-be-measured dummy rib is less than a preset limit value.

4. The method according to claim 1, further comprising:
determining coordinates of the position, corresponding to the sampling point, on the to-be-measured dummy rib according to the laser beam emitted from the laser range finder and the corresponding reflected laser received by the laser range finder or the imaging component;
performing polynomial fitting on an outer contour of the to-be-measured dummy rib on a horizontal plane according to the coordinates of the position, corresponding to each sampling point, on the to-be-measured dummy rib, to obtain a fitting curve expression corresponding to the to-be-measured dummy rib;
performing polynomial fitting on an outer contour of the pre-designed initial dummy rib on the horizontal plane, to obtain a fitting curve expression corresponding to the initial dummy rib; and
calculating a degree of deformation of the to-be-measured dummy rib on the horizontal plane according to the fitting curve expression corresponding to the to-be-measured dummy rib and the fitting curve expression corresponding to the initial dummy rib.

5. The method according to claim 4, wherein both the to-be-measured dummy rib and the initial dummy rib are of a C-shaped structure; the C-shaped structure comprises four curve segments and three straight segments, the straight segments and the curve segments are disposed alternately, each straight segment is used for connecting two adjacent curve segments, and each curve segment corresponds to a laser device group; and the C-shaped structure is divided into a first segment and a second segment by a middle perpendicular of a straight segment opposite an opening of the C-shaped structure.

6. The method according to claim 5, wherein
the performing polynomial fitting on an outer contour of the to-be-measured dummy rib on a horizontal plane according to the coordinates of the position, corresponding to each sampling point, on the to-be-measured dummy rib, to obtain a fitting curve expression corresponding to the to-be-measured dummy rib comprises:
performing polynomial fitting on a first outer contour corresponding to the first segment of the to-be-measured dummy rib on the horizontal plane according to the coordinates of the position, corresponding to each sampling point, on the first segment of the to-be-measured dummy rib, to obtain a first fitting curve expression corresponding to the first segment of the to-be-measured dummy rib; and
performing polynomial fitting on a second outer contour corresponding to the second segment of the to-be-measured dummy rib on the horizontal plane according to the coordinates of the position, corresponding to each sampling point, on the second segment of the to-be-measured dummy rib, to obtain a second fitting curve expression corresponding to the second segment of the to-be-measured dummy rib;
accordingly, the performing polynomial fitting on an outer contour of the pre-designed initial dummy rib on the horizontal plane, to obtain a fitting curve expression corresponding to the initial dummy rib comprises:
performing polynomial fitting on a first outer contour corresponding to a first segment of the pre-designed initial dummy rib on the horizontal plane, to obtain a first fitting curve expression corresponding to the first segment of the initial dummy rib; and
performing polynomial fitting on a second outer contour corresponding to a second segment of the pre-designed initial dummy rib on the horizontal plane, to obtain a second fitting curve expression corresponding to the second segment of the initial dummy rib; and
accordingly, the calculating a degree of deformation of the to-be-measured dummy rib on the horizontal plane according to the fitting curve expression corresponding to the to-be-measured dummy rib and the fitting curve expression corresponding to the initial dummy rib comprises:
calculating a degree of deformation of the first segment of the to-be-measured dummy rib on the horizontal plane according to the first fitting curve expression corresponding to the first segment of the to-be-measured dummy rib and the first fitting curve expression corresponding to the first segment of the initial dummy rib; and
calculating a degree of deformation of the second segment of the to-be-measured dummy rib on the horizontal plane according to the second fitting curve expression corresponding to the second segment of the to-bemeasured dummy rib and the second fitting curve expression corresponding to the second segment of the initial dummy rib.

7. The method according to claim 6, wherein the degree of deformation of the first segment of the to-be-measured dummy rib on the horizontal plane is calculated by using a first formula as follows:

$$P_{left} = \frac{\sum_{i=1}^{h}\left(Y_{lefti} - \overline{Y_{left}}\right)\left(Y_{lefti}^* - \overline{Y_{left}^*}\right)}{\sqrt{\sum_{i}^{h}\left(Y_{lefti} - \overline{Y_{left}}\right)^2 \sum_{i}^{h}\left(Y_{lefti} - \overline{Y_{left}^*}\right)^2}}$$

wherein $P_{left}$ is a degree of horizontal bending of a left portion of the to-be-measured dummy rib, $Y_{lefti}$, is an ordinate of an $i^{th}$ position in the first fitting curve expression corresponding to the left portion of the to-be-measured dummy rib, and $\overline{Y}_{left}$ is an average value of ordinates of all positions in the first fitting curve expression corresponding to the left portion of the to-be-measured dummy rib; $Y^*_{lefti}$ is an ordinate of an $i^{th}$ position in the first fitting curve expression corresponding to a left portion of the initial dummy rib; $\overline{Y}^*_{left}$ is an average value of ordinates of all positions in the first fitting curve expression corresponding to the left portion of the initial dummy rib; and h is the number of positions, with fixed intervals, selected in the first fitting curve expression corresponding to the left portion of the to-be-measured dummy rib and the first fitting curve expression corresponding to the left portion of the initial dummy rib separately.

8. The method according to claim 6, wherein the degree of deformation of the second segment of the to-be-measured dummy rib on the horizontal plane is calculated by using a second formula as follows:

$$P_{right} = \frac{\sum_{i=1}^{h}\left(Y_{righti} - \overline{Y_{right}}\right)\left(Y_{righti}^* - \overline{Y_{right}^*}\right)}{\sqrt{\sum_{i}^{h}\left(Y_{righti} - \overline{Y_{right}}\right)^2 \sum_{i}^{h}\left(Y_{righti} - \overline{Y_{right}^*}\right)^2}}$$

wherein $P_{right}$ is a degree of horizontal bending of a right portion of the to-be-measured dummy rib, $Y_{righti}$ is an ordinate of an $i^{th}$ position in the second fitting curve expression corresponding to the right portion of the to-be-measured dummy rib, and $\overline{Y}_{right}$ is an average value of ordinates of all positions in the second fitting curve expression corresponding to the right portion of the to-be-measured dummy rib; $Y^*_{righti}$ is an ordinate of an $i^{th}$ position in the second fitting curve expression corresponding to a right portion of the initial dummy rib; $\overline{Y}^*_{right}$ is an average value of ordinates of all positions in the second fitting curve expression corresponding to the right portion of the initial dummy rib; and h is the number of positions, with fixed intervals, selected in the second fitting curve expression corresponding to the right portion of the to-be-measured dummy rib and the second fitting curve expression corresponding to the right portion of the initial dummy rib, respectively.

9. The method according to claim 6, wherein a stationary fixture for fixing the to-be-measured dummy rib is disposed at the straight segment opposite the opening of the C-shaped structure in the to-be-measured dummy rib.

* * * * *